US006920243B2

United States Patent
Damera-Venkata

(10) Patent No.: US 6,920,243 B2
(45) Date of Patent: Jul. 19, 2005

(54) COLOR SMOOTH ERROR DIFFUSION

(75) Inventor: Niranjan Damera-Venkata, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 663 days.

(21) Appl. No.: 09/940,991

(22) Filed: Aug. 27, 2001

(65) Prior Publication Data

US 2003/0038953 A1 Feb. 27, 2003

(51) Int. Cl.[7] .................... G06K 9/00; H04N 1/419
(52) U.S. Cl. .................... 382/162; 358/3.03
(58) Field of Search .................... 382/162, 165, 382/167, 237, 251, 252, 253; 358/1.9, 3.03, 3.23, 501, 518, 520, 523

(56) References Cited

U.S. PATENT DOCUMENTS

| | | | | |
|---|---|---|---|---|
| 5,497,180 A | * | 3/1996 | Kawakami et al. | 347/131 |
| 5,565,994 A | * | 10/1996 | Eschbach | 358/3.03 |
| 5,621,545 A | * | 4/1997 | Motta et al. | 358/518 |
| 5,748,785 A | * | 5/1998 | Mantell et al. | 382/237 |
| 5,838,885 A | * | 11/1998 | Shu et al. | 358/1.9 |
| 6,031,974 A | * | 2/2000 | Takahashi et al. | 358/1.9 |
| 6,081,344 A | * | 6/2000 | Bockman et al. | 358/1.9 |
| 6,118,905 A | * | 9/2000 | Uehara et al. | 382/252 |
| 6,552,824 B2 | * | 4/2003 | Rombola et al. | 358/3.14 |
| 6,760,127 B1 | * | 7/2004 | Shin et al. | 358/3.03 |

* cited by examiner

*Primary Examiner*—Andrew W. Johns
*Assistant Examiner*—Amir Alavi

(57) ABSTRACT

Embodiments of the present invention include a method for generating a halftone image. This method comprises the steps of choosing a set of allowed colors, processing a color value, quantizing color value, and outputting a halftone pixel according to quantizing step. In one embodiment, a look up table is utilized to provide significant speedup over conventional implementations, especially in when implemented in software. The result is high quality imaging with excellent color smoothness and sharpness.

12 Claims, 5 Drawing Sheets

COLOR SMOOTH ERROR DIFFUSION

BACKGROUND OF THE INVENTION

1. Field of the Invention

The present invention relates to imaging technology. More specifically, the present invention relates to the method of halftoning a color image.

2. Related Art

Error diffusion is a high quality method for halftoning an image. Halftoning is the process where a grayscale image is converted to a binary image for the purpose of rendering on a binary device such as a printer. It is assumed that 255 represents a printer dot and 0 represents no printer dot. Error diffusion halftoning diffuses the quantization error at a given image pixel to future unprocessed image pixels. A naive extension of grayscale error diffusion to color is to process the cyan (C), magenta (M), yellow (Y) and black (K) planes independently using a grayscale error diffusion halftoning algorithm. However, such an approach ignores the correlation among the color planes and produces undesirable color halftone noise due to the unintended overlapping of color dots from the different planes. For example a light gray tone of 10% C, 10% M and 10% Y will result in identical dot placement and thus produce composite black dots (C=M=Y=255) on a light background, resulting in an undesirable high contrast pattern. A more pleasing pattern of dots is to print 10% C, 10% M and 10% Y dots without any overlap, so that the color variation is minimized while still reproducing the graytone. The present invention produces smooth color patterns with minimized color fluctuation. The colors allowed at a particular color tone are determined by the luminance level of the tone. The rendered color is chosen as the color in the set of colors allowed that minimizes the perceived color difference using a weighted CIELab error metric. The quantization errors are diffused in the colorant space although quantization is performed in CIELab. The invention may be regarded as an extension (in spirit) of the invention described in J. Allebach and Q. Lin, "Joint design of color dither matrices for a set of colorants", patent application, HP PDNO 10951098-1,1997 (which designed dither matrices to minimize color fluctuation) to error diffusion. Due to the properties of error diffusion the invention typically produces higher quality sharper results than algorithms based on dither matrices.

One of the common ways of halftoning a color image is to compare the image with a dither matrix, and either print a dot or not print a dot depending on the outcome of the comparison. Previously, a method of designing a set of color dither matrices jointly was described. The dither matrices were designed to minimize colorimetric perceptual color fluctuation in CIELab color space. A tone ramp of uniform gray tones exclusively along the black-white tone axis was used to jointly generate C, M and Y dither matrices. When applied to an image it is still possible for the algorithm to produce undesirable color fluctuation since:

1. An image does not have only uniform regions, and may have rapidly changing colors and edge gradients.
2. Colors occur which do not lie on the black-white axis.

Case 1 for example, causes a loss in spatial resolution along edges in the image and causes the image sharpness to be compromised. Case 2 indicates that undesirable color fluctuations could occur when the dither matrices are applied in regions where the colors deviate appreciably from the black-white axis. These drawbacks of using dither matrices in general. Since the dither matrices are pre-designed they have low complexity and are easy to implement. However pre-designed dither matrices are not able to adapt to the color tones as they occur in an image. This motivates the use of error diffusion. The present invention retains (conceptually) the general properties of the jointly designed dither matrices (a.k.a. color smooth dither) in error diffusion, such as perceptual color fluctuation minimization in CIELab space and control of the colors permitted at a given gray tone. The invention described accomplishes these objectives by performing quantization in a CIELab space and defining the colors allowed not only along the black-white axis but for arbitrary color tones.

Previous color error diffusion algorithms such as R. Klassen and K. Bharat, "Vector error diffusion in a distorted color space," and C. Y. Kim, I. Kweon and Y. S. Seo, "Color and printer models for color halftoning," perform quantization and diffusion of quantization errors in either the device independent nonlinear CIELab space, or the linear device independent XYZ space. In each case the nearest color dot to the current modified input pixel (current pixel under consideration modified by adding a filtered version of past quantization errors) is determined in the CIELab or the XYZ space and the error is then diffused using the same space. Error diffusion filtering assumes color coordinates that are linearly related linearly to luminance. This excludes the CIELab space for diffusing quantization errors. The linear XYZ space is suitable for diffusion of the quantization errors but does not account for the nonlinear nature of the human visual system. The present invention performs quantization in device independent CIELab color space but diffuses the quantization error in the device dependent CMYK color space. The device CMYK printer space (after appropriate color matching) has an approximately linear relationship between color coordinates and luminance. While the diffusion could theoretically also be done in the device independent XYZ space, the distorted gamut of the color dots in XYZ space results in significant gamut mismatch errors producing color shifts in the output halftone. The device CMYK space has a robust cubical gamut. Diffusion in CMYK also gives us the key advantage of being able to produce color smooth clustered dot halftones for robust printing on laser printers and printers with high dot gain characteristics via a simple modification of the invention. Such an approach is not known in either the CIELab or XYZ color space diffusion systems. Recently, Lau et al "Digital color halftoning with generalized error diffusion and multi-channel green-noise masks" extended Levin's work ("Output dependent feedback in error diffusion halftoning") on producing error diffused halftones with clustered dots, to color images. The invention described here extends to color clustered dot halftoning by incorporating output dependent feedback into the color smooth error diffusion framework. Thus the present invention controls the color reproduction, color smoothness and the overlap of arbitrary secondary and tertiary colors. Thus in a given color tone the present invention could allow C, M, Y, R, G apart from white and not allow any other colors. Such flexibility is not possible with the method of Lau. Lau's algorithm does not consider calorimetric color reproduction at all. The present invention uses a weighted CIELab decision space instead of the usual CIELab space. The present invention gives luminance errors a greater weight but still considers the chrominance contribution to the color fluctuation. Finally, the present invention controls the colors allowed in the halftone depending on the input color tone. Thus a tone of 10% C, 20% M and 30% C will be halftoned exclusively with C, M and Y dots only without overlap. Thus the quantization is done under the constraint that the output dot be restricted one out of a set of allowed colors. This set may vary depending on the color pixel being halftoned. Such an approach while retaining colorimetric color reproduction capability also produces smooth color patterns with minimized perceptual fluctuation without compromising image sharpness. It is to be noted that the present invention works with an arbitrary number of device dependent process colors which may or may not include the often used CMYK color space which we use here as an example of a device dependent color space.

The complexity of implementing the invention may be reduced by observing that the unintended overlap or clumping of C and M dots producing blue (B) is the most undesirable. Thus a reasonable approach is to halftone the C and M planes in a plane dependent manner and halftone the Y and K planes independently. Here the assumption is that the colors red (R) and green (G) produced due to the overlap of M and Y and C and Y respectively are produce less visible color variation in comparison with blue and composite black dots. Since on most inkjets the K dots could be designed to be sparse by appropriate color separation, the K plane is also processed independently. Typically several comparisons and/or computations are performed to determine if a C dot, an M dot or a B dot should be placed at a given location. The present invention folds these computations/comparisons into a few lookup tables (LUTs). In the present invention, based on the current tone a LUT is selected from a bank of LUTs and the output dot is directly determined by using the C and M modified input values to lookup the appropriate color dot to be placed. Thus the computational effort involved goes into designing the LUTs and may be performed offline. Thus the present invention provides significant speedup over conventional implementations, especially when implemented in software.

SUMMARY OF THE INVENTION

In accordance with the present invention, a method for color smooth error diffusion is disclosed. Embodiments of the present invention provide a high quality method for halftoning an image. Error diffusion halftoning diffuses the quantization error at a given image pixel to future unprocessed image pixels. The present invention discloses a method that produces smooth color patterns with minimized color fluctuation.

Embodiments of the present invention include a method for generating a halftone image. This method comprises the steps of choosing a set of allowed colors, processing a color value, quantizing color value, and outputting a halftone pixel according to quantizing step. In one embodiment, a look up table is utilized to provide significant speedup over conventional implementations, especially in when implemented in software. The result is high quality imaging with excellent color smoothness and sharpness.

The present invention also includes a visually weighted Euclidean distance measure in CIELab color space that is then computed between each of the allowed dots. Another embodiment of the present invention produces color smooth error diffused halftones using a fast LUT based algorithm.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

NOTATION AND NOMENCLATURE

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

Figure 1:
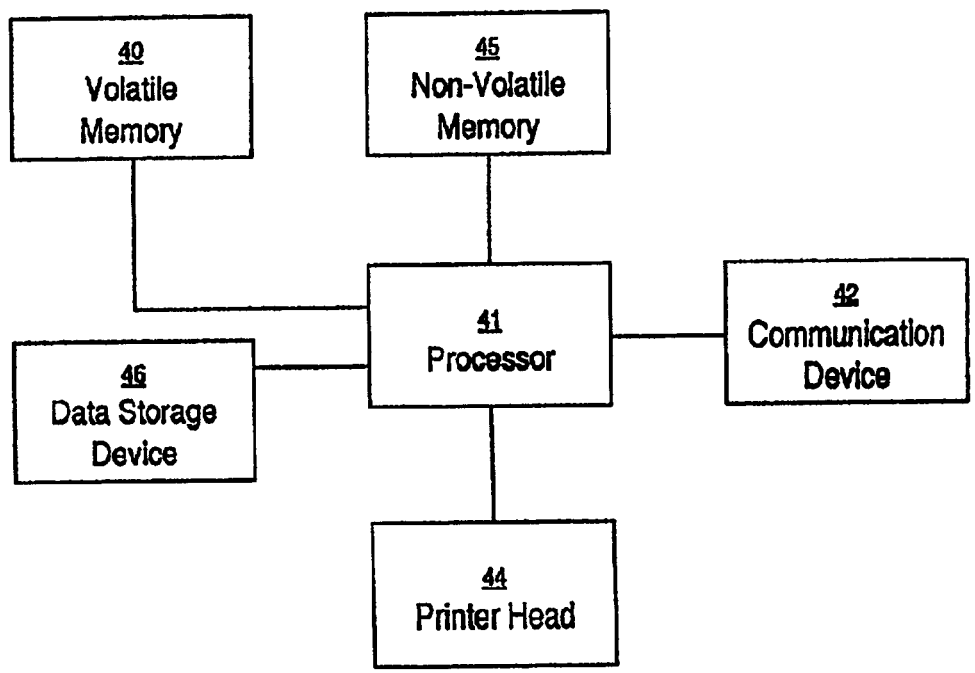
FIG. 1 is a block diagram of a printer.

FIG. 1 is a block diagram of exemplary printer system 10 in accordance with one embodiment of the present invention. The printer system 10 includes a central processor for processing information and instructions. It is appreciated that central processor unit 41 may be a microprocessor or any other type of processor. The printer system includes printer head 44 for printing data to a media. The printer system 10 also includes data storage features such as a volatile memory 40 (e.g., random access memory, static RAM, dynamic RAM, etc.) for storing information and instructions for the central processor 41 and a non-volatile memory 45 (e.g., read only memory, programmable ROM, flash memory, EPROM, EEPROM, etc.) for storing static information and instructions for the processor 41. Printer system 10 may also include an optional data storage device 46 (e.g., thin profile removable memory) for storing information and instructions. It should be understood that device 46 may be removable. Furthermore, device 46 may also be a secure digital (SD) card reader or equivalent removable memory reader.

Also included in printer system 40 of FIG. 1 is a signal communication device 42 that may be a serial port (or USB port) for enabling system 40 to communicate with a PC. As mentioned above, in one embodiment, the communication interface is a serial communication port, but could also alternatively be of any of a number of well known communication standards and protocols, e.g., parallel, SCSI, Ethernet, FireWire (IEEE 1394), USB, etc. including wireless communication.

Figure 2:
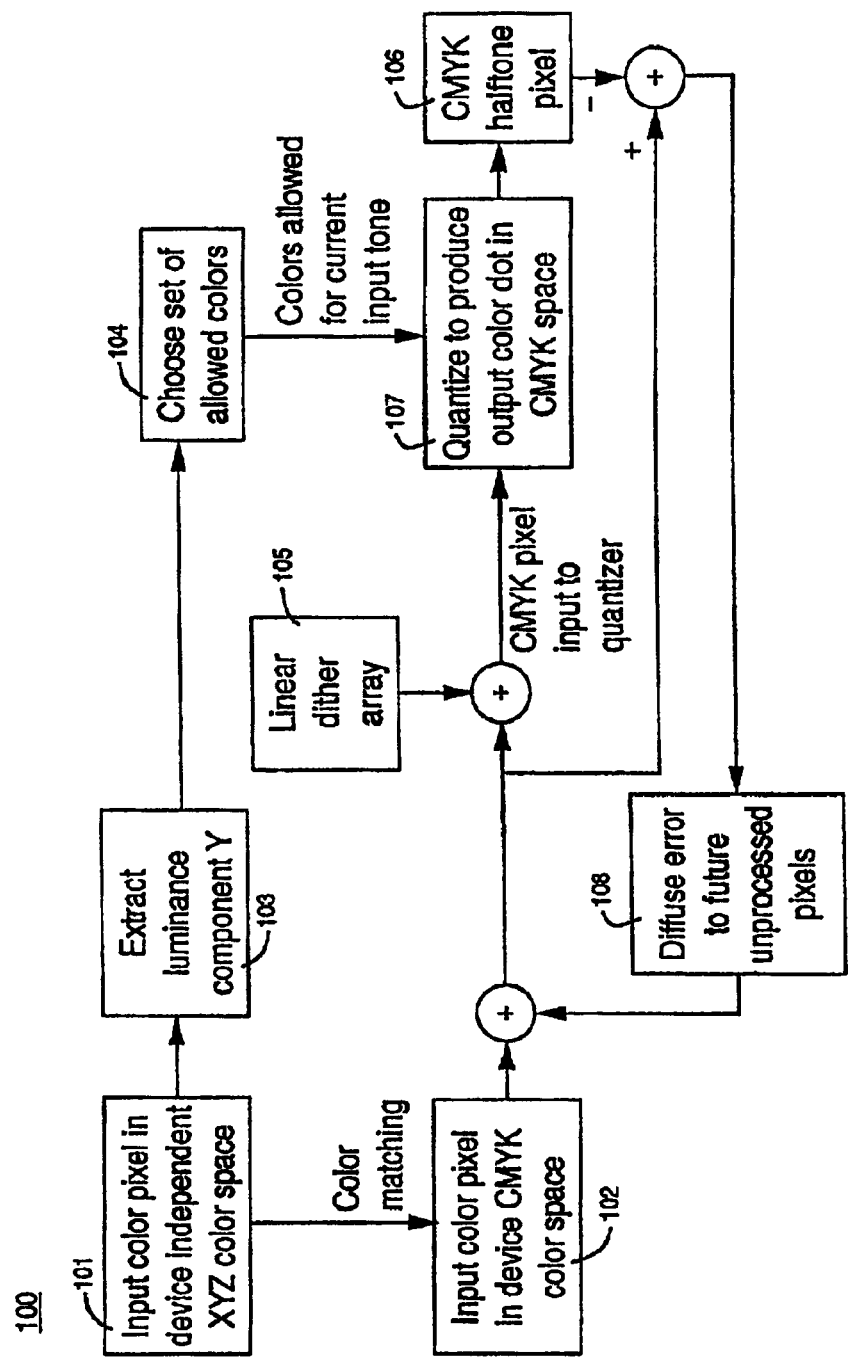
FIG. 2 is a flow chart of the color smooth error diffusion algorithm.

FIG. 2 shows a flow chart 100 of the color smooth error diffusion algorithm. First the input image pixel 101 (which is usually in RGB space) is converted into a device independent XYZ or RGB space. This may be accomplished by applying a point nonlinearity followed by a linear transform. The Y component of the XYZ representation is used to determine the colors allowed in the tone. For example in the case of CMY halftoning the following strategy could be adopted:

1. Y>170, allow W, C, M, Y
2. 170>=Y>127, allow W, C, M, Y, R, G
3. 127>=Y>93, allow W, C, M, Y, R, G, B
4. Y<=93, allow W, C, M, Y, R, G, B, composite black The input XYZ is then transformed via usual color matching into the device dependent CMYK color space 102. This is typically accomplished easily via lookup tables (LUTs) (not shown in figure). The input CMYK pixel is then modified by adding past weighted past quantization errors just as in regular error diffusion 108. A linear dither array 105 is used to add low level blue-noise to the modified input pixel to prevent the occurrence of directional artifacts in the output halftone. The operation of the quantizer 107 is described in FIG. 3.

Figure 3:
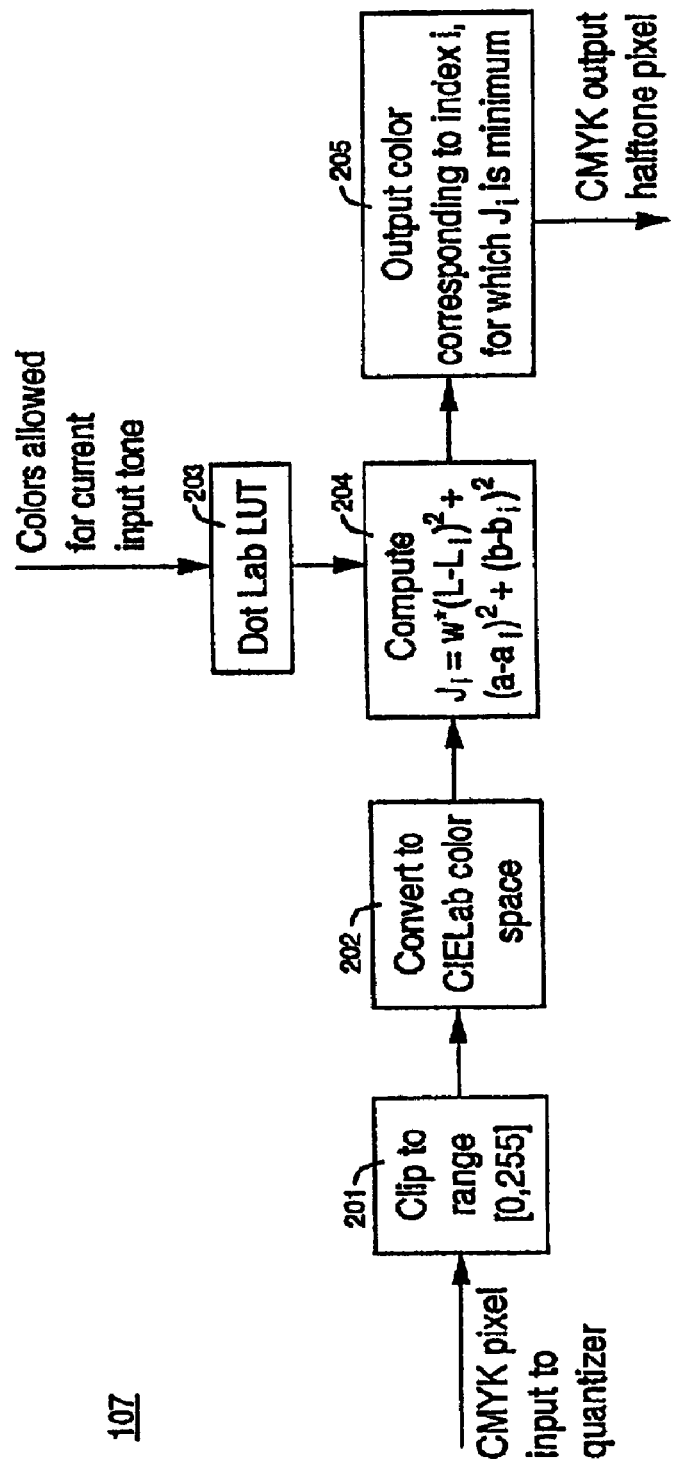
FIG. 3 is a flow chart of the quantization process used in the invention.

In FIG. 3 the quantizer 107 converts its input CMYK pixel into CIELab color space 202. This may be accomplished by first clipping 201 to the valid range [0,255] and converting it to XYZ color space via either an inverse International Color Consortium (ICC) LUT or well known printer models (not shown in figure). The input may then be converted to Lab color space using the standard XYZ to CIELab conversion equations (not shown in figure). The colors allowed at the current tone 104 are converted to CIELab space via a precompiled LUT 203. A weighted Euclidean distance measure is then computed between each of the allowed dots and the CIELab version 202 of the input to the quantizer 107. The weighted distance measure 204 is defined in CIELab color space by the equation $J_i=W(L-L_i)^2+(a-a_i)^2+(b-b_i)^2$. Here W (typically=4) is a weighting on luminance which allows us to give more importance to minimization of luminance deviation. The output color dot 106 is computed using 205 as the color that has the minimum $J_i$ among the allowed colors. The output is again a color in device CMYK space. The error between the CMYK input to the quantizer and the CMYK output is then computed and diffused with an appropriate error filter to modify unprocessed CMYK input image pixels in a neighborhood around the current pixel being processed. Thus the quantization is in the CIELab space while the diffusion is in the CMYK space.

Figure 4:
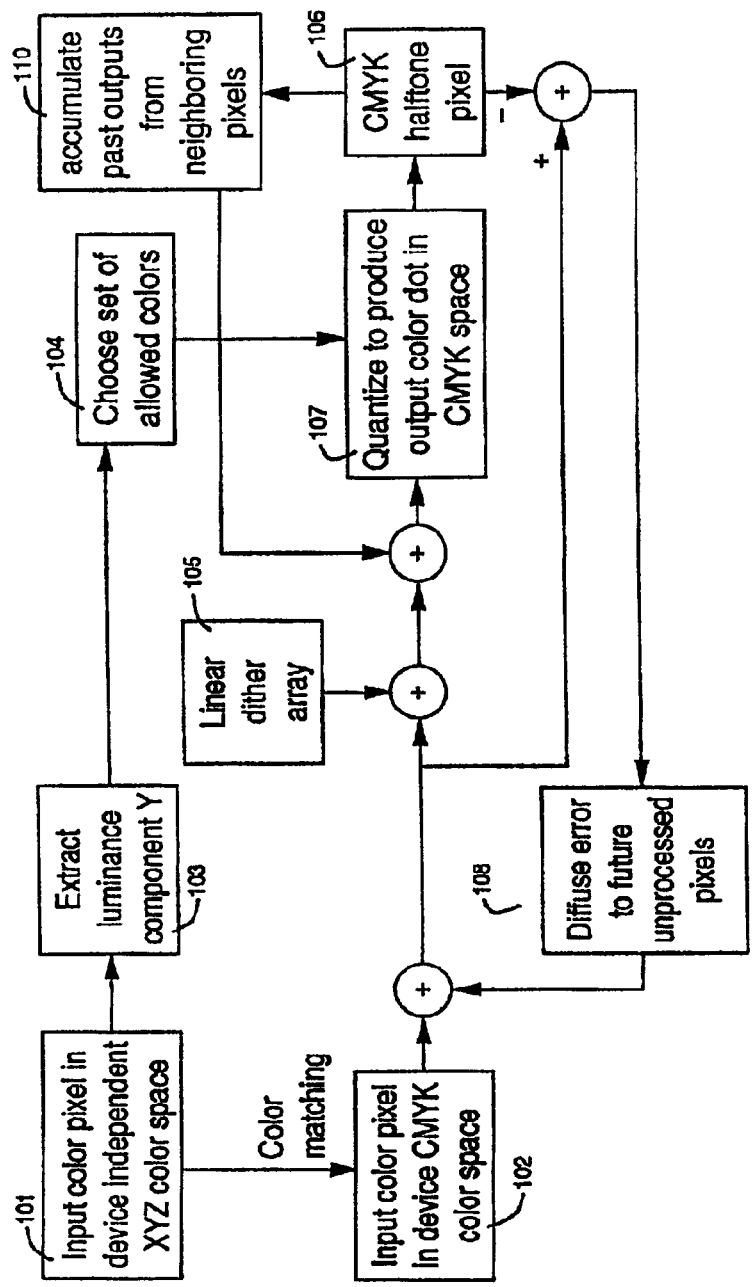
FIG. 4 is a flow chart of one embodiment of the present invention used to produce color halftones with clustered dots and minimized color fluctuation.

FIG. 4 shows a simple modification of the invention allowing it to produce clustered dot halftones with minimized color fluctuation. This embodiment of the present invention adds a filtered version of the output back to the quantizer input to produce dot clustering 110. Owing to the nature of the quantization and color control described in this invention the color dots are not only clustered but are produced with excellent color smoothness and tone controlled overlap.

Figure 5:
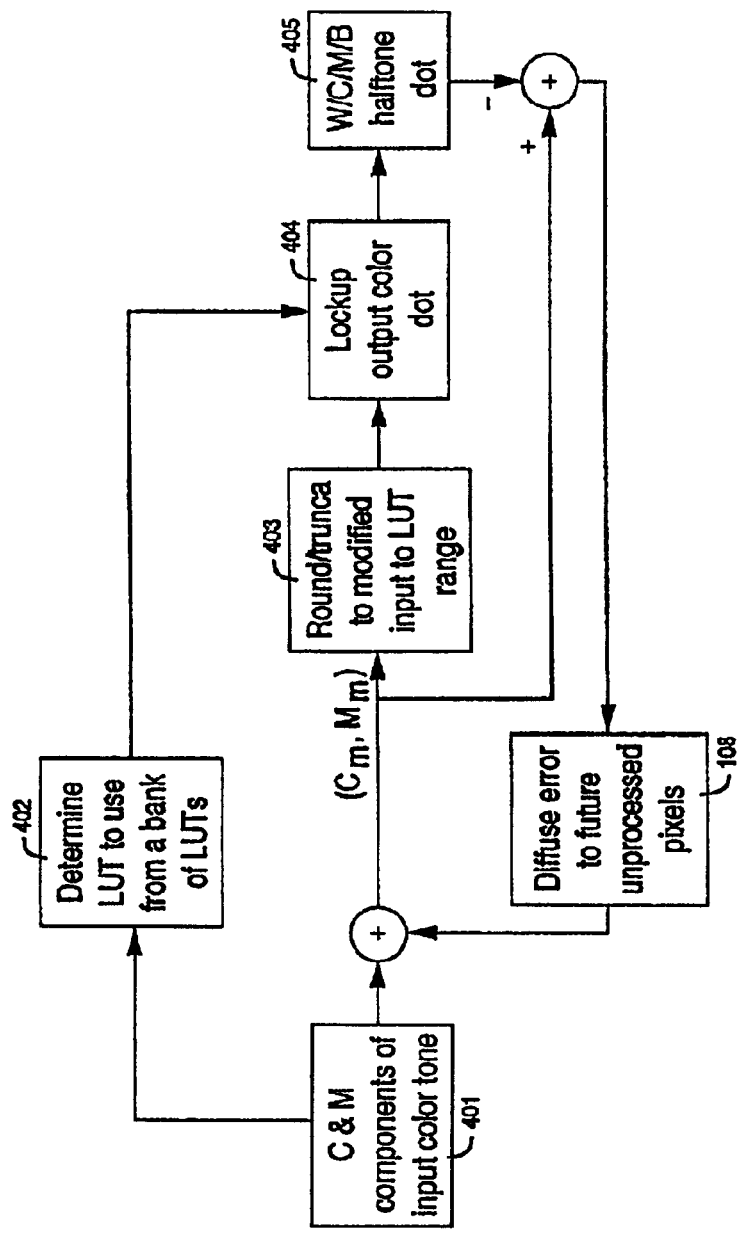
FIG. 5 is a flow chart of one embodiment of the present invention that illustrates how the invention may be implemented efficiently using lookup tables.

FIG. 5 shows a flow chart of the LUT based color diffusion algorithm. First the appropriate LUT to be used is determined 402 from the C and M components 401 of the input color tone. The LUT takes two inputs, the C and M components of the modified input pixel. Since an integer value is required for table lookup, the modified input co-ordinate in cyan-magenta (C-M) space is either rounded or truncated to an integer value and clipped to lie in the range of coordinate values addressed by the LUT 403. The result of the lookup operation 404 is a 2 bit number representing a white dot (W, no C or M dot is placed), a C dot, a M dot or a B dot (both C and M dots are placed) 405. The errors between the modified input to the quantizer (Cm and Mm) and the output color dot is then computed for the C and M planes and accumulated with an appropriate error filter to modify the next C and M components of the input image pixel respectively 108. The Y and K planes may be halftoned using conventional error diffusion. Standard modifications to error diffusion such as adding low level dither to break up patterns may be incorporated before the lookup operation. Further reduction in the memory required to store the LUTs may be achieved by using sequential scalar quantization (implemented using separable LUTs) prior to output dot table lookup.

Clearly, there are several possible strategies to design the lookup tables. One approach is to start with a working color error diffusion algorithm and design LUTs to implement the decision logic. An embodiment of the invention is described here to produce color smooth error diffused halftones using the fast LUT based algorithm. FIG. 2 shows flow diagram of the color smooth error diffusion algorithm. FIG. 3 shows the computationally expensive CIELab quantization step. The essential features of this algorithm may be transferred to the LUT based fast error diffusion of FIG. 5 as follows:

1. The Y and K planes are halftoned independently
2. Two different LUTs are used depending on weather the input color tone in the C-M space has C+M<255 or not. Thus the bank of LUTs consists of 2 LUTs in this case. The colors allowed if C+M<255 are W, C, M and if C+M>=255 are W, C, M, and B
3. The entire quantization step shown in FIG. 3 is encoded in two 256×256 2-bit LUT s. The LUTs are of 2-bit depth since there are only 4 possible output color dots in the C-M plane. Thus all possible combinations of C and M modified inputs are used to pre-calculate the output color dots in each case.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for generating a halftone image comprising:

choosing a set of allowed colors;

processing a color value;

quantizing said processed color value in a distorted device independent color space according to said set of allowed colors;

diffusing quantization errors in device dependent color space;

outputting a halftone pixel according to said quantizing step and;

weighting said distorted device independent color space to discourage luminance fluctuations.

2. A method according to claim 1 wherein, said distorted color space is CIELab colorspace.

3. A method according to claim 1 wherein, said output pixel is a CMYK halftone pixel.

4. A method according to claim 1 wherein, said set of allowed colors corresponds a given tone of said device dependent colorspace.

5. A method according to claim 1 wherein, said output pixel is a RGB halftone pixel.

6. A method according to claim 1 wherein, a look up table is used to compute said quantization step.

7. A method for generating a halftone image comprising:

choosing a set of allowed colors;

processing a color value;

quantizing said processed color value in a distorted device independent color space according to said set of allowed colors;

diffusing quantization errors in device dependent color space;

outputting clustered halftone pixels according to said quantizing step wherein said output is feedback to said quantizing step.

8. An apparatus for generating a halftone image comprising:

a chooser for choosing a set of allowed colors;

a processor for processing a color value;

a quantizer for quantizing said processed color value in a distorted device independent color space according to said set of allowed colors;

a diffuser to diffuse quantization errors;

a weighter for weighting said distorted device independent color space for reducing luminance fluctuations; and an output device for outputting a halftone pixel according to said quantizing step.

9. An apparatus according to claim 8, wherein, a look up table is used for quantizing said color value.

10. An apparatus according to claim 8, wherein, said distorted color space is CIELab colorspace.

11. An apparatus according to claim 8 wherein, said output pixel is a CMYK halftone pixel.

12. An apparatus according to claim 8, wherein, said set of allowed colors corresponds to a given tone of said device dependent color space.

* * * * *